United States Patent [19]
Ishikawa et al.

[11] Patent Number: 5,149,721
[45] Date of Patent: Sep. 22, 1992

[54] PROCESS FOR PRODUCING POLYSTYRENE RESIN FOAM

[75] Inventors: Mikio Ishikawa, Tochigi; Toshiro Kobayashi, Ibaraki, both of Japan

[73] Assignee: Sekisui Kaseihin Kogyo K.K., Nara, Japan

[21] Appl. No.: 813,663

[22] Filed: Dec. 27, 1991

[30] Foreign Application Priority Data

Dec. 27, 1990 [JP] Japan ................................. 2-408426

[51] Int. Cl.$^5$ .............................................. C08J 9/14
[52] U.S. Cl. ........................................ 521/79; 264/53; 521/97; 521/146; 521/908
[58] Field of Search ................ 521/79, 97, 146, 908; 264/53

[56] References Cited

U.S. PATENT DOCUMENTS

| | | | |
|---|---|---|---|
| 2,989,782 | 6/1961 | Barkhuff, Jr. et al. | 521/57 |
| 3,480,570 | 11/1969 | Roberts et al. | 521/57 |
| 3,789,028 | 1/1974 | Heiskel et al. | 521/57 |
| 4,042,541 | 8/1977 | Watts | 521/79 |
| 4,125,490 | 11/1978 | Hettinga | 521/51 |
| 4,238,570 | 12/1980 | Shibata et al. | 521/57 |
| 4,520,136 | 5/1985 | Schwarz | 521/57 |

*Primary Examiner*—Morton Foelak
*Attorney, Agent, or Firm*—Sughrue, Mion, Zinn, Macpeak & Seas

[57] ABSTRACT

A process for producing a polystyrene resin foam is disclosed, which comprises supplying an extruding machine with a polystyrene resin, a fine inorganic powder and a highly volatile foaming agent, heating them to melt, and extruding the melt from the nozzle into a zone of the lower pressure, wherein 0.01 to 2 parts by weight of an alcoholic ester of a higher fatty acid is added to 100 parts by weight of the polystyrene resin. The process insures that foams having a skin of good aesthetic appeal that are free from staining and malodor can be produced consistently for a prolonged time without any fire hazard.

5 Claims, No Drawings

PROCESS FOR PRODUCING POLYSTYRENE RESIN FOAM

FIELD OF THE INVENTION

This invention relates to a process by which polystyrene resin foams having a skin of good aesthetic appeal can be produced by performing extrusion consistently for a prolonged time.

BACKGROUND OF THE INVENTION

In the conventional manufacture of polystyrene resin foams, amides, waxes, metal soaps, liquid paraffin and various other additives have been used to reduce the load on the extruding machine and thereby to obtain foams having a satisfactory appearance. However, since the heretofore used additives have no antistatic effect, the resin being extruded from a nozzle may often develop a static buildup on account of the friction with the molding device and can potentially catch fire. Problems have also occurred in the final product, as exemplified by the deposition of dirt, staining, malodor, etc., due to static buildup. Another problem has resulted from the use of inorganic fine powders as void control agents and insufficiently dispersed particles often stay within the extruding machine or form deposits, which are occasionally extruded from the machine to introduce defects in the final product.

The present inventors reviewed various additives with a view to solving the aforementioned problems of the prior art; as a result, they found that all of the problems could be solved by adding 0.01 to 2 parts by weight of an alcoholic ester of a higher fatty acid to 100 parts by weight of a polystyrene based resin.

Higher fatty acid esters of polyhydric alcohols are commonly used as lubricants or antistats in polyvinyl chloride, polyethylene and polypropylene but not in polystyrene resins. Mono-, di- and triglycerides of stearic acid are the most often used of the higher fatty acid esters of polyhydric alcohols Foams that are free from shrinkage can be obtained by using those glycerides in the manufacture of polyethylene foams and this has been well known by being disclosed in JP-B-46-43997, JP-B-46-43998, JP-B-47-33505, JP-B-58-30896, etc. (The term "JP-B" as used herein means an "examiner Japanese patent publication".) As regards polystyrene resin foams, natural fats and oils containing triglycerides as main components have sometimes been used as described in JP-A-60-233135. (The term "JP-A" as used herein means an "unexamined published Japanese patent application".)

SUMMARY OF THE INVENTION

Under the circumstances, the present inventors reviewed the aforesaid fats and oils, amides, metal soaps, liquid paraffin and other additives for use in the manufacture of polystyrene resin foams and found that they caused many problems such as fire hazard, staining, malodor and insufficient dispersion of fine inorganic particles. However, it was found unexpectedly that foams with a skin having good aesthetic appeal could be extruded consistently for a prolonged time when alcoholic esters of higher fatty acids were used.

The present invention thus provides a process for producing a polystyrene resin foam, which comprises supplying an extruding machine with a polystyrene resin, a fine inorganic powder and a highly volatile foaming agent, heating them to melt, and extruding the melt from a nozzle into a zone of lower pressure, wherein 0.01 to 2 parts by weight of an alcoholic ester of a higher fatty acid is added to 100 parts by weight of the polystyrene resin.

DETAILED DESCRIPTION OF THE INVENTION

While the alcoholic ester of a higher fatty acid to be used in the present invention is selected from among the compounds in which polyhydric alcohols are combined with higher fatty acids by an ester bond, particularly preferred examples are such that at least one residual hydroxyl group is present in a free form in one molecule of the ester.

Polyhydric alcohols that form the alcoholic ester of a higher fatty acid to be used in the present invention may be exemplified by glycerin, pentaerythritol, sorbitol, sorbitan, mannitol, mannitan, dipentaerythritol, diglycerin, etc. Exemplary higher fatty acids include saturated or unsaturated monovalent higher fatty acids containing 10 to 30 carbon atoms such as capric acid, lauric acid, myristic acid, palmitic acid, stearic acid, palmitoleic acid, oleic acid, linoleic acid, etc., as well as tallow fatty oils, rice bran oil fatty acids, coconut oil fatty acids, etc. that contain those higher fatty acids.

Specific examples of such alcoholic esters of higher fatty acids include lauric acid mono- or diglyceride, palmitic acid mono- or diglyceride, stearic acid mono- or diglyceride, pentaerythritol monocaprate, pentaerythritol monooleate, pentaerythritol monolaurate, dipentaerythritol distearate, sorbitan monooleate, sorbitan sesqui-rice bran oil fatty acid esters, sorbitan monopalmitate, sorbitan monolaurate, sorbitan monosterate, mannitan monooleate, mannitan monolaurate, etc. Of these alcoholic esters of higher fatty acids, mono- or diglycerides, particularly stearic acid monoglyceride (hereunder abbreviated as "SMG") and stearic acid diglyceride, are most preferred.

The above-listed alcoholic esters of higher fatty acids are used in amount of 0.01 to 2 parts by weight, preferably 0.01 to 1.0 part by weight, per 100 parts by weight of the polystyrene resin. If their addition amount is less than 0.01 part by weight, the alcoholic esters of higher fatty acids will not achieve the intended effect; if it exceeds 2 parts by weight, the resulting foam will have unduly large voids or it will become undesirably sticky.

The term "polystyrene resin" as used herein covers not only a styrene homopolymer but also copolymers of styrene with aromatic vinyl compounds such as α-methylstyrene or other vinyl compounds such as acrylonitrile and methyl acrylate.

The method of adding the alcoholic esters of higher fatty acids to the polystyrene resin is in no way limited and any common methods may be adopted. Typical examples include: a method in which the polystyrene resin is previously mixed with an alcoholic ester of a higher fatty acid in a blender and the mixture is subsequently fed into the extruding machine; a method in which the polystyrene resin, as it is foamed by extrusion, is mixed with an alcoholic ester of a higher fatty acid that is forced into the resins while it is optionally dissolved in a foaming agent; and a method in which a styrene monomer is polymerized while, at the same time, an alcoholic ester of a higher fatty acid is added so that it will be present in the polystyrene resin. Preferably, a polystyrene resin is melted in the extruding machine which already contains an alcoholic ester of a higher fatty acid at a concentration higher than a desired level, and this method insures consistent supply of the feed into the extruding machine.

The polystyrene resin having the alcoholic ester of higher fatty acid added thereto is further mixed with a foaming agent and a fine inorganic powder, and optionally an antioxidant, an antistat, a flame retardant, a pigment, a filler and other components that may be used as required, and the resulting mixture is foamed by extrusion in the usual manner.

The fine inorganic powder is used to adjust the number of cells or voids in the foam and talc, sodium hydrogencarbonate, calcium carbonate, clay and citric acid may be generally used. Among them, talc in a fine powder form, preferably talc having an average particle size of no more than 8 μm, may advantageously be used. More preferably, both talc and the alcoholic ester of higher fatty acid may be previously incorporated in the polystyrene resin at concentrations higher than desired levels; this helps provide better dispersion in the extruding machine, so that high performance can be exhibited even if talc and the alcoholic ester of higher fatty acid are used in small amounts.

Thus, by using the alcoholic ester of higher fatty acid in accordance with the present invention, various types of skinned polystyrene resin foams can be manufactured very efficiently. It should be particularly noted here that if the resin foam being extruded from a nozzle is continuously stretched so that it is formed into a desired shape by the drag of an outer or inner mold, the lubricating and antistatic effects of the alcoholic ester of higher fatty acid will combine to insure that a skin of good aesthetic appeal can be produced consistently for a prolonged time.

If desired, propane, butane, methyl chloride, ethyl chloride and other inflammable compounds may be used as the highly volatile foaming agent and they are particularly advantageous in view of their ability to prevent the fire hazard due to static buildup.

The alcoholic ester of higher fatty acid to be used in the present invention also serves as a dispersant, so it enables the fine inorganic powder to be dispersed in an efficient way, thereby offering the added advantage that the extruding and foaming operations can be performed consistently over a prolonged period without allowing the inorganic fine particles to stay and accumulate at dead angles of the mold in the extruding machine.

In one preferred embodiment of the practice of the present invention for molding a polystyrene resin foam, a nozzle having a flat slit is connected to a molding device the inside surface of which is provided with a polytetrafluoroethylene coat or sheet and the foam being extruded from the nozzle is stretched, with its dimensions being regulated externally to produce a foamed board having a void diameter of 0.1 to 1 mm, a density of 0.02 to 0.05 g/cc and a thickness of 10 to 50 mm.

In another preferred embodiment, a nozzle having an annular slit is used and a tubular foam being extruded from the nozzle is stretched along the inner cylinder (i.g., plug) as it is slit to produce a foamed sheet having a void diameter of 0.05 to 0.5 mm, a density of 0.05 to 0.2 g/cc and a thickness of 0.5 to 3 mm.

In still another preferred embodiment, a nozzle having an annular slit is used and a tubular foam being extruded from the nozzle is pressed from the outside while it is stretched with its interior being fused, thereby producing a foamed board having a void diameter of 0.05 to 0.5 mm, a density of 0.05 to 0.2 g/cc and a thickness of 3 to 20 mm.

If the concept of the present invention is applied to either one of these common methods of blowing polystyrene resins, foams with a skin of good aesthetic appeal that are free from staining and malodor can be produced consistently for a prolonged time without the risk of catching fire. The term "skin" as used herein means not only the skin that is formed spontaneously upon cooling with air atmosphere when the polystyrene resin is extruded from the nozzle into a zone of the lower pressure but also the skin that is formed by positive cooling with cold air or a cooling device. It should, however, be noted that even those skins contain many air voids and that their number varies with the foaming ratio and void diameter.

The following examples are provided for the purpose of further illustrating the present invention but are in no way to be taken as limiting.

EXAMPLE 1

A hundred parts by weight of a polystyrene resin (Vicat softening point: 103° C.; MI value: 4.5) was mixed with 2 parts by weight of a fine talc powder (average particle size: 2 μm), 2.0 parts by weight of hexabromocyclododecane (bromine-containing flame retardant) and 8 parts by weight of concentrated pellets of SMG (Excel 124 of Kao Corporation). The concentrated pellets of SMG were obtained by extruding a 75:24:1 mixture of the polystyrene resin, fine talc powder and SMG described above.

The blend of polystyrene resin, talc powder, hexabromocyclododecane and concentrated SMG pellets was charged into the extruding machine and mixed with methyl chloride (foaming agent) that was forced into the extruding machine in a position halfway its length in an amount of 2.4 mole per kilogram of the resin. The resin was extruded from the nozzle with its temperature being adjusted to 125° C. at the exit end of the extruding machine. The nozzle had a rectangular slit (1 mm × 560 mm) bored at the tip, which was fitted with a molding device composed of an upper plate and a lower plate. The surfaces of the molding device over which the resin would pass were lined with a polytetrafluoroethylene sheet 1 mm thick.

By taking up the extruded resin while holding it down by means of the molding plates, foams with a skin having good aesthetic appeal could be produced consistently for 7 days; the foams had a thickness of 25 mm, a width of 1,000 mm, an average void diameter of 0.35 mm, and a density of 0.03 g/cc.

Those foamed boards were suitable for use as the core of tatami flooring or as heat insulators.

COMPARATIVE EXAMPLE 1

Extrusion molding was performed as in Example 1 except that the amount of the fine talc powder was increased to 4 parts by weight and that no concentrated pellets of SMG were used. As a result, methyl chloride occasionally caught fire between the molding plates on account of static buildup; furthermore, the skin formation on the moldings became so instable that after 10 hours, the skin broke.

EXAMPLE 2

Ninety-five parts by weight of a polystyrene resin (Vicat softening point: 97° C.; MI value: 2.3), 5 parts by weight of a polystyrene resin with a butadiene content of 10 wt % (Vicat softening point: 93° C.; MI value: 1.5), 0.8 part by weight of a fine talc powder (average particle size: 4 μm) and 1.1 parts by weight of the same concentrated pellets of SMG as used in Example 1 were mixed uniformly by means of a tumbler and the mixture was fed from the hopper into an extruding machine at a rate of 100 kg per hour.

The ingredients were heated to about 200° C. to melt in the extruding machine while, at the same time, butane was forced into the extruding machine as a foaming agent in an amount of 0.27 mole per kilogram of the resin and it was mixed with the melt. The molten mixture was foamed by being extruded into air atmosphere through an annular slit with a gap of 0.35 mm that was fitted at the distal end of the extruding machine.

The resulting cylindrical foam was drawn by being stretched through a cooled plug and slit with a cutter, so that a foamed sheet having a thickness of 0.8 mm, a width of 1,200 mm, an average void diameter of 0.08 mm and a density of 0.17 g/cc was taken up onto a roll.

This operation was continued for 120 hours and yet a satisfactory foamed sheet could be obtained in a consistent manner without clogging of the screen at the exit end of the extruding machine nor protrusion of any foreign matter. The foamed sheet may be thermally formed for use as a container.

COMPARATIVE EXAMPLE 2

The procedure of Example 2 was repeated except that the concentrated pellets of SMG were replaced by the same amount of magnesium stearate. After 80 hours of a continued operation, foreign matter was extruded from the nozzle to make holes in the foamed sheet. Inspection of the extruder with the head opened revealed that a large amount of talc was deposited on the screen.

EXAMPLE 3

Ninety-five parts by weight of a polystyrene resin (MFR: 1.7; Vicat softening point: 108° C.) was mixed with 5 parts by weight of a master batch prepared by kneading said polystyrene with 10 wt % of an oil containing 60% glycerin monoester of stearic acid. To the mixture, 0.5 part by weight of fine talc powder (average particle size: 8 μm) was added and the resulting blend was fed through the hopper on an extruding machine consisting of two units coupled together. About 6 parts by weight of butane was forced as a foaming agent into the first unit of the extruding machine in a position halfway its cylinder length. The feed was fully melt-mixed in the extruding machine and extruded into air atmosphere through a nozzle with an annular slit that was fitted at the distal end of the second unit of the extruding machine. The extrudate was blown into a balloon and as it was degassed from the side, the balloon was held between a pair of rolls so that it was shaped into a flat plate. The web was cut to predetermined lengths, thereby continuously producing satisfactory foamed boards having a thickness of 7 mm, a width of 830 mm and a density of 0.06 g/cm$^3$. The foamed boards were comprised of fine cells (voids) and they had a skin of good aesthetic appeal.

The voltage of static charge on the outer surface of the balloon as extruded from the nozzle was measured with a potentiometer; it was found to be 1 to 1.5 kV, which was low enough to reduce the chance of butane of catching fire.

As a comparison, foamed boards were extruded from the same formulations as those employed in Examples 1 to 3 except that glycerin esters of stearic acid were not added. The foamed boards had an unseemly appearance since many abrasion marks developed on their surface. The voltage of static charge as measured on the outer surface of the balloon in the same position as selected in Examples 1 to 3 was in the range of 8 to 12 kV, which was high enough to cause occasional fires due to the discharge of static buildup.

COMPARATIVE EXAMPLE 3

The procedure of Example 3 was repeated except that the oil containing 60% glycerin monoester of stearic acid was replaced by stearic acid triglyceride.

The voltage of static charge on the outer surface of the balloon as extruded from the nozzle was 5 to 10 kV, which was very high in the chance of butane of catching fire.

EXAMPLE 4

A hundred parts by weight of a polystyrene resin (MFR: 1.8; Vicat softening point: 102° C.) was mixed with 1.0 part by weight of fine talc powder (average particle size: 2 μm) and the resulting blend was fed into an extruding machine and 0.5 part by weight of ricinoleic acid monoglyceride and about 4 parts by weight of butane as a foaming agent were forced into the extrducing machine in a position halfway its length.

The feed was fully melt-mixed in the extruding machine and extruded into air atmosphere at a rate of 150 kg per hour through an annular slit with a gap of 0.5 mm that was fitted at the distal end of the extruding machine.

In the same manner as in Example 2, the resulting cylindrical foam was drawn by being stretched through a cooled plug and slit with a cutter, so that a foamed sheet having a thickness of 2 mm, a width of 1,040 mm, an average void diameter of 0.1 mm and a density of 0.08 g/cc was taken up onto a roll.

This operation was continued for 96 hours and yet satisfactory foamed sheet could be obtained in a consistent manner without clogging of the screeen at the exit end of the extruding machine nor formation of deposits at the exit end of the mold.

The foamed sheet had a skin of good aesthetic appeal with gloss.

In accordance with the present invention, an alcoholic ester of a higher fatty acid is added in an amount as small as 0.01 to 2 parts by weight to 100 parts by weight of a polystyrene resin and this insures that foams having a skin of good aesthetic appeal that are free from staining and malodor can be produced consistently for a prolonged time without any fire hazard.

While the invention has been described in detail and with reference to specific embodiments thereof, it will be apparent to one skilled in the art that various changes and modifications can be made therein without departing from the spirit and scope thereof.

What is claimed is:

1. A process for producing a polystyrene resin foam, which comprises supplying an extruding machine with a mixture of polystyrene resin, a fine inorganic powder and a highly volatile foaming agent, heating the mixture to an extrudable state, and extruding the mixture from the nozzle into a zone of lower pressure, wherein 0.01 to 2 parts by weight of an alcoholic ester of a higher fatty acid is added to 100 parts by weight of the polystyrene resin.

2. A process as in claim 1, wherein the alcoholic ester of higher fatty acid is a monoglyceride or diglyceride of a higher fatty acid.

3. A process as in claim 1, wherein the alcoholic ester of higher fatty acid is stearic acid monoglyceride or stearic acid diglyceride.

4. A process as in claim 1, wherein the alcoholic ester of higher fatty acid is previously mixed with the polystyrene resin and fed into an extruding machine together with the polystyrene resin.

5. A process as in claim 1, wherein the alcoholic ester of higher fatty acid and the fine inorganic powder are previously mixed with the polystyrene resin and fed into an extruding machine together with the polystyrene resin.

* * * * *